United States Patent
Ling et al.

(10) Patent No.: US 9,246,170 B2
(45) Date of Patent: Jan. 26, 2016

(54) MGMN$_2$O$_4$ WITH A CRYSTAL STRUCTURE ANALOGUE TO CAFE$_2$O$_4$, CAMN$_2$O$_4$, OR CATI$_2$O$_4$ AS RECHARGEABLE MAGNESIUM BATTERY CATHODE

(71) Applicant: Toyota Motor Engineering & Manufacturing North America, Inc., Erlanger, KY (US)

(72) Inventors: Chen Ling, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/851,642

(22) Filed: Mar. 27, 2013

(65) Prior Publication Data
US 2014/0295280 A1 Oct. 2, 2014

(51) Int. Cl.
*H01M 4/505* (2010.01)
*H01M 10/054* (2010.01)
*H01M 4/131* (2010.01)
*H01M 4/02* (2006.01)

(52) U.S. Cl.
CPC ............. *H01M 4/505* (2013.01); *H01M 4/131* (2013.01); *H01M 10/054* (2013.01); *H01M 2004/021* (2013.01); *Y02E 60/122* (2013.01)

(58) Field of Classification Search
CPC ........................... H01M 4/131; H01M 10/054
USPC .......................................................... 429/224
See application file for complete search history.

(56) References Cited

U.S. PATENT DOCUMENTS

2012/0219856 A1* 8/2012 Doe et al. ...................... 429/211
2012/0219859 A1 8/2012 Doe et al.

FOREIGN PATENT DOCUMENTS

| CN | 102082270 A | 6/2011 |
| EP | 0581290 A1 | 2/1994 |
| JP | 06-049577 B2 | 6/1994 |
| JP | 06-227820 A | 8/1994 |
| JP | 08-195196 A | 7/1996 |
| JP | 2001076721 A | 3/2001 |
| JP | 4742412 B2 | 8/2011 |

OTHER PUBLICATIONS

"Spinel to CaFe2O4 Type Structural Transformation in LiMn24 under High Pressure", Kazunari Yamaura, et al., J.Am.Chem.Soc. 2006, 128, pp. 9448-9456.

"Structural transition of post-spinel phases Spinel to CaMn2O4, CaFe2O4 and CaTi2O4 pCaFe2O4 under High Pressures Up to 80 GPa", T. Yamanaka et al., American Mineralogist, vol. 93, pp. 1874-1881, 2008.

* cited by examiner

*Primary Examiner* — Ladan Mohaddes
(74) *Attorney, Agent, or Firm* — Dinsmore & Shohl LLP

(57) ABSTRACT

A cathode active material for a battery includes a material of the formula Mg$_x$Mn$_2$O$_4$ wherein $0 \leq x \leq 1$ and the material has a crystal structure having an open channel formed in a single dimension or along a single dimensional axis. The crystal structure may be an analogue to CaFe$_2$O$_4$, CaMn$_2$O$_4$ or CaTi$_2$O$_4$.

9 Claims, 5 Drawing Sheets

MGMN$_2$O$_4$ WITH A CRYSTAL STRUCTURE ANALOGUE TO CAFE$_2$O$_4$, CAMN$_2$O$_4$, OR CATI$_2$O$_4$ AS RECHARGEABLE MAGNESIUM BATTERY CATHODE

FIELD OF THE INVENTION

The invention relates to cathode active materials for rechargeable batteries.

BACKGROUND OF THE INVENTION

Rechargeable batteries such as lithium ion and magnesium ion batteries have numerous commercial applications. Energy density is an important characteristic, and higher energy densities are desirable for a variety of applications.

A magnesium ion in a magnesium or magnesium ion battery carries two electrical charges, in contrast to the single charge of a lithium ion. Improved electrode materials would be useful in order to develop high energy density magnesium batteries.

SUMMARY OF THE INVENTION

In one aspect, there is disclosed a cathode active material for a battery that includes a material of the formula Mg$_x$Mn$_2$O$_4$ wherein 0≤x≤1 and the material has a crystal structure including an open channel formed in a single dimension or along a single dimensional axis. The crystal structure may be an analogue to the CaFe$_2$O$_4$ phase or to the CaMn$_2$O$_4$ phase, or to the CaTi$_2$O$_4$ phase.

In another aspect, there is disclosed a cathode active material for a magnesium battery that includes a material of the formula Mg$_x$Mn$_2$O$_4$ wherein 0≤x≤1 and the material has a crystal structure including an open channel formed in a single dimension or along a single dimensional axis. The crystal structure may be an analogue to the CaFe$_2$O$_4$ phase or to the CaMn$_2$O$_4$ phase, or to the CaTi$_2$O$_4$ phase.

In yet a further aspect, there is disclosed a magnesium ion battery that includes a cathode material of the formula Mg$_x$Mn$_2$O$_4$ wherein 0≤x≤1 and the material has a crystal structure including an open channel formed in a single dimension or along a single dimensional axis, an anode material having a magnesium containing compound, an electrolyte disposed between the anode and cathode allowing diffusion of magnesium ions wherein magnesium cations are reversibly stripped and deposited between the anode and cathode. The crystal structure may be an analogue to the CaFe$_2$O$_4$ phase or to the CaMn$_2$O$_4$ phase, or to the CaTi$_2$O$_4$ phase.

DETAILED DESCRIPTION OF THE PREFERRED EMBODIMENTS

In one aspect, there is disclosed a cathode active material for a battery that has a material of the formula Mg$_x$Mn$_2$O$_4$ wherein 0≤x≤1 and the crystal structure of the material has an open channel along a single dimension.

Figure 1:
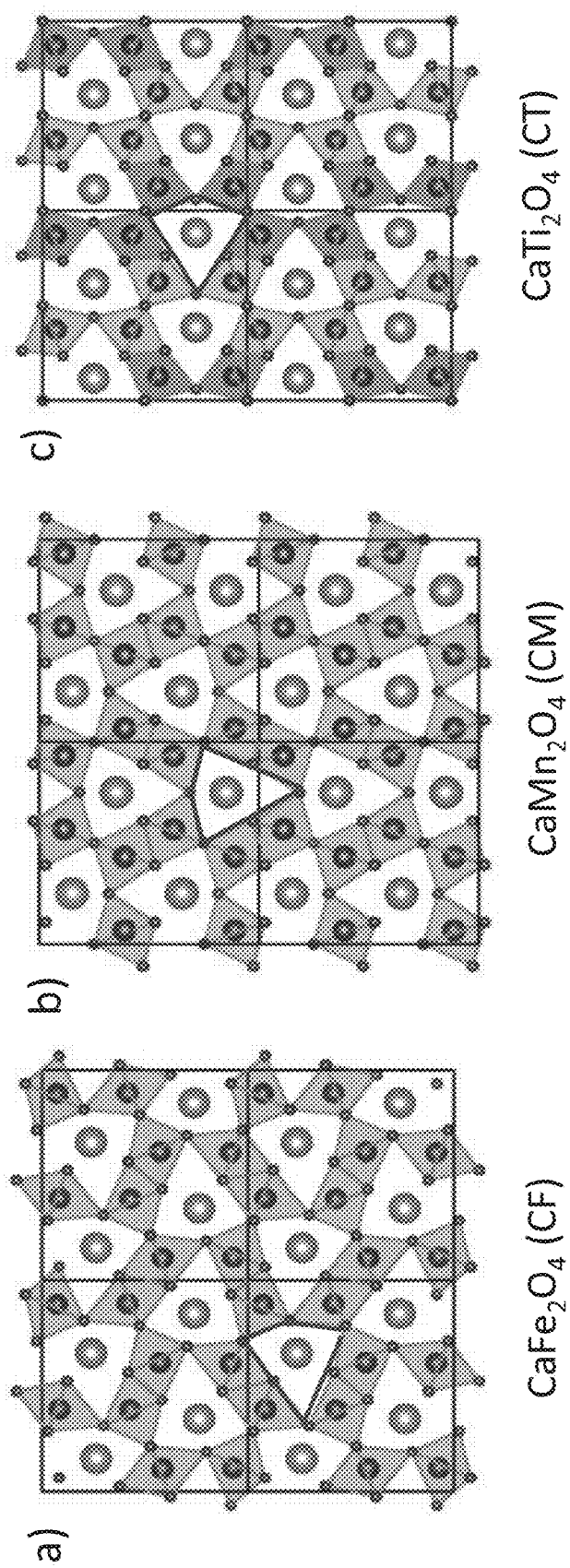
FIG. 1 is a perspective view of the structure of a compound having the formula Mg$_x$Mn$_2$O$_4$ with a crystal structure analogue to CaFe$_2$O$_4$, CaMn$_2$O$_4$ and CaTi$_2$O$_4$.

In one aspect, there is disclosed a cathode active material for a battery that has a material of the formula Mg$_x$Mn$_2$O$_4$ wherein 0≤x≤1. In one aspect, the material has a crystal structure analogue to the CaFe$_2$O$_4$, or to the CaMn$_2$O$_4$, or to the CaTi$_2$O$_4$ phase. The crystal structures of the CaFe$_2$O$_4$, and the CaMn$_2$O$_4$, and the CaTi$_2$O$_4$ are shown in FIG. 1. In all these structures, the framework of MnO$_6$ octahedrons form open channels along a single dimension. The ionic diffusion of magnesium ions happens through the channel and not through inter-channel diffusion.

Figure 2:
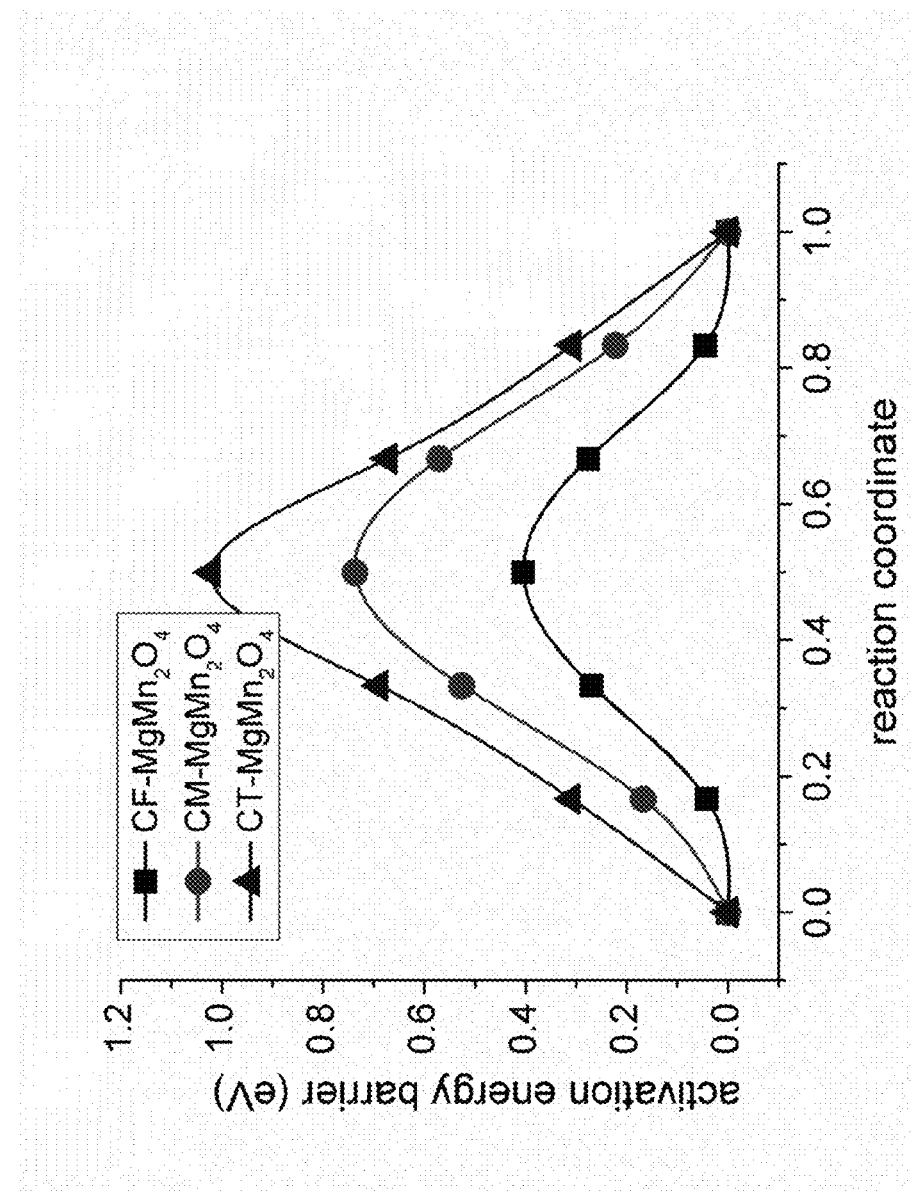
FIG. 2 is a plot of diffusion barriers for Mg$^{2+}$ ions in MgMn$_2$O$_4$ with a crystal structure analogue to the CaFe$_2$O$_4$ or to the CaMn$_2$O$_4$, or to the CaTi$_2$O$_4$.
Figure 3:
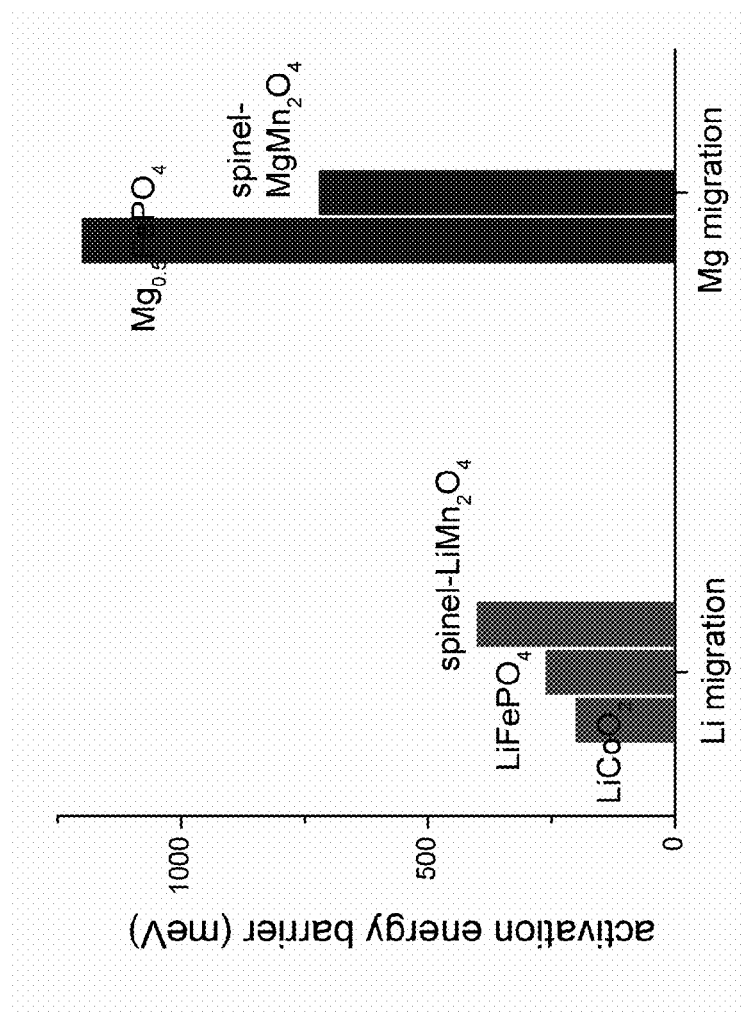
FIG. 3 is a chart showing the activation energy barriers for the diffusion of Li$^+$ and Mg$^{2+}$ in materials that are widely used as Li-ion battery cathodes.

The activation energy barriers for the diffusion of Mg$^{2+}$ ions in MgMn$_2$O$_4$ with a crystal structure analogue to the CaFe$_2$O$_4$ or to the CaMn$_2$O$_4$, or to the CaTi$_2$O$_4$ phase are shown in FIG. 2. The activation energy barriers for the diffusion of Li$^+$ or Mg$^{2+}$ ions in other materials are plotted in FIG. 3. All the materials shown in FIG. 3, LiCoO$_2$, LiFePO$_4$ and spinel-LiMn$_2$O$_4$, are well-known cathode materials that have been widely applied in Li-ion batteries. As can be seen in the figure, the activation energy barriers differ widely for both magnesium and lithium materials for the spinel as well as the iron phosphate material. Additionally, as shown in the figure, the change from a lithium ion to a magnesium ion for various cathode materials results in differing properties and activation energy barriers between lithium and magnesium. Specifically, there appears to be little correspondence between the activation energy barriers between lithium and magnesium materials having similar type compounds. The diffusion barrier of Mg$^{2+}$ in these materials is typically higher than 0.7 eV. It suggests that these materials have very sluggish Mg$^{2+}$ mobility. It limits their application as possible cathode materials for Mg battery.

In one aspect, as shown in FIG. 2, the diffusion barrier of magnesium in MgMn$_2$O$_4$ with a crystal structure analogue to the CaFe$_2$O$_4$ or to the CaMn$_2$O$_4$ has a diffusion barrier that is comparable to that of lithium in a spinel type lithium ion battery cathode. As can be seen in the figure, the activation barrier is on the order of approximately 0.4-0.7 electron volts for the diffusion of Mg$^{2+}$ ions.

Figure 5:
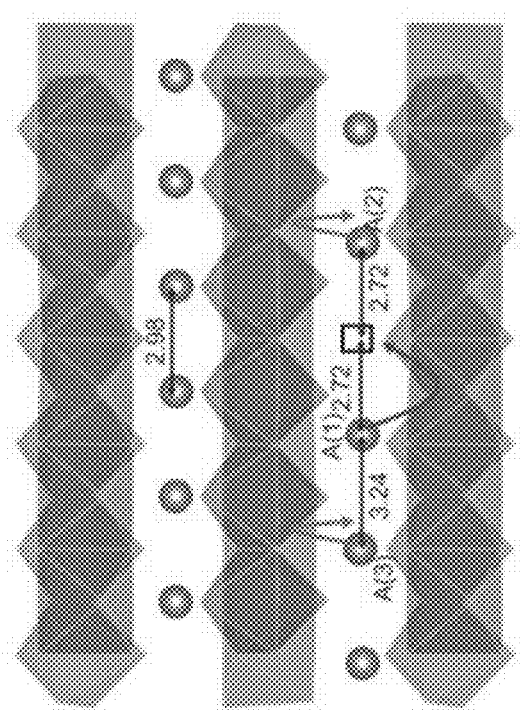
FIG. 5 is a schematic representation of the one-dimensional diffusion of ions utilizing a distance between Mg$^{2+}$ ions in units of angstroms in MgMn$_2$O$_4$ with crystal structure analogue to the CaFe$_2$O$_4$.

The lower diffusion barrier in MgMn$_2$O$_4$ with the structure analogue to the CaFe$_2$O$_4$ or CaMn$_2$O$_4$ phase may be explained with reference to FIG. 5. The creation of a vacancy displaces two adjacent cations A1 and A2 in the figure towards the vacancy wherein cation A is Mg$^{2+}$. If A1 hops from the equilibrium position to the vacancy, large Columbic repulsion is generated because of the short distance between A1 and A2. In this manner, A2 pushes along the hopping direction of A1. A3 is also attracted by the vacancy towards the direction of the diffusion of A1. Unlike the diffusion of individual ions in a spinel compound, the diffusion of Mg$^{2+}$ in MgMn$_2$O$_4$ with the structure analogue to the CaFe$_2$O$_4$ or CaMn$_2$O$_4$ is a cooperative motion between A1, A2, and A3 along the open channel in a single dimension. Such a collective and collaborative hopping, as a characteristic for the hopping along the open channel in a single dimension, is energetically advantageous because it shortens the diffusion distance for each ion.

Cathode materials with high cationic mobility may be utilized as rechargeable battery electrodes. For the electrode materials, high ionic conductivity may be correlated to good rate capability. Slow diffusion may limit the rate capability of the electrodes and may prevent insertion and removal of cations.

Figure 4:
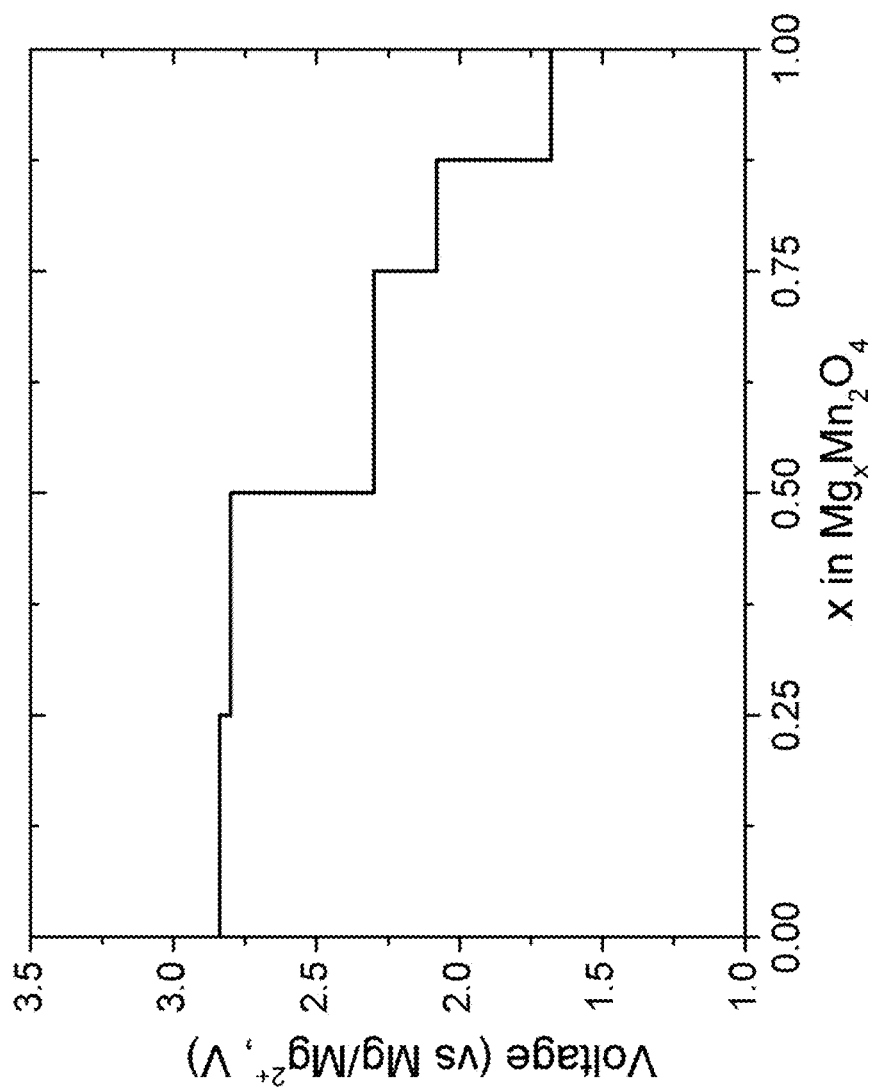
FIG. 4 is a plot for electrochemical insertion of Mg$^{2+}$ into CaFe$_2$O$_4$ phase Mg$_x$Mn$_2$O$_4$.

As stated above, the low barrier for diffusion of $Mg^{2+}$ ions in materials with a crystal structure analogue to $CaFe_2O_4$ or the $CaMn_2O_4$ with open channels in a single dimension indicates that it may be utilized for insertion and removal of $Mg^{2+}$ ions in a cathode active material. Referring to FIG. 4, there is shown a plot of the voltage profiles for electrochemical insertion and removal of magnesium into the $MgMn_2O_4$ phase with a crystal structure analogue to $CaFe_2O_4$. The voltages for the magnesium insertion are between 2.84 and 1.68 volts (vs. $Mg/Mg^{2+}$). In one aspect, if the full capacity for the $MgMn_2O_4$ phase with a crystal structure analogue to $CaFe_2O_4$ is achieved, the capacity would be 270.1 mAh per gram with half the magnesium per manganese. On the basis of this capacity and the voltage, the energy density of the $MgMn_2O_4$ phase with a crystal structure analogue to $CaFe_2O_4$ is about 1.3 times that of a lithium ion battery cathode which has a voltage ~3.5 volts vs. $Li/Li+$, and a capacity ~150 milliamp hours per gram.

The invention claimed is:

1. A cathode active material for a battery comprising: a material of the formula: MgxMn2O4 wherein 0≤x≤1 and the material has a crystal structure analogue to the CaFe2O4, or to the CaMn2O4, or to the CaTi2O4 and a framework of MnO6 octahedrons form open channels along a single dimension.

2. The cathode active material of claim 1 wherein the material has a crystal structure analogue of $CaFe_2O_4$.

3. The cathode active material of claim 1 wherein the material has an activation barrier for $Mg^{2+}$ of less than or equal to 0.4 eV.

4. A cathode active material for a magnesium battery comprising: a material of the formula: MgxMn2O4 wherein 0×1 and the material has a crystal structure analogue to the CaFe2O4, or to the CaMn2O4, or to the CaTi2O4 phase and a framework of MnO6 octahedrons form open channels along a single dimension.

5. The cathode active material of claim 4 wherein the material has a crystal structure analogue of $CaFe_2O_4$.

6. The cathode active material of claim 4 wherein the material has an activation barrier for $Mg^{2+}$ of less than or equal to 0.4 eV.

7. A magnesium ion battery comprising: a cathode material of the formula MgxMn2O4 wherein 0≤x≤1 and the material has a crystal structure analogue to the CaFe2O4, or to the CaMn2O4, or to the CaTi2O4 and a framework of MnO6 octahedrons that form open channels along a single dimension; an anode material having a magnesium containing compound; an electrolyte disposed between the anode and cathode allowing diffusion of magnesium ions wherein magnesium cations are reversibly transported between the anode and cathode.

8. The cathode material of claim 7 wherein the material has a crystal structure analogue of $CaFe_2O_4$.

9. The cathode material of claim 7 wherein the material has an activation barrier for Mg2+ of less than or equal to 0.4 eV.

* * * * *